(12) United States Patent
Meng et al.

(10) Patent No.: US 7,020,798 B2
(45) Date of Patent: Mar. 28, 2006

(54) DETECTING LOW-LEVEL DATA CORRUPTION

(75) Inventors: Yi Meng, Bellevue, WA (US); John D. Service, Monroe, WA (US); FNU Sidhartha, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 659 days.

(21) Appl. No.: 10/185,612

(22) Filed: Jun. 27, 2002

(65) Prior Publication Data

US 2004/0003316 A1    Jan. 1, 2004

(51) Int. Cl.
G06F 11/00 (2006.01)
(52) U.S. Cl. ......................................................... 714/6
(58) Field of Classification Search ..................... 714/6
See application file for complete search history.

(56) References Cited

U.S. PATENT DOCUMENTS

| | | | | |
|---|---|---|---|---|
| 4,213,201 A | * | 7/1980 | Gagnier et al. | 370/220 |
| 5,220,567 A | * | 6/1993 | Dooley et al. | 714/704 |
| 5,493,649 A | | 2/1996 | Slivka et al. | 395/185.01 |
| 2003/0023933 A1 | * | 1/2003 | Duncan | 714/807 |
| 2004/0086086 A1 | * | 5/2004 | Butler et al. | 379/9 |

OTHER PUBLICATIONS

Barbara, Daniel; Goel, Rajni; and Jajodia, Sushil; "*Using Checksums to Detect Data Corrpution*"; Advances in Database Technology—EDBT 2000. 7th International Conference on Extending Database Technology. Proceedings (Lecture Notes in Computer Science vol. 1777), pp. 136-149.
Jackson, Dr. Keith; "*Checksum Methods Used to Detect Virus Attacks*"; Virus Bulletin, pp. 7-8.

* cited by examiner

*Primary Examiner*—Bryce P. Bonzo
(74) *Attorney, Agent, or Firm*—Workman Nydegger

(57) ABSTRACT

Checksum values are used to detect low-level data corruption. I/O operations, such as, for example, read operations and write operations, cause data blocks to pass through a number of low-level drivers when the data blocks are transferred between an operating system and mass storage location. A checksum filter driver intercepts a data block as the data block passes between low-level drivers as a result of the performance of an I/O operation. The checksum filter driver calculates a first checksum value for the data block. The checksum filter subsequently intercepts the data block as the data block passes between low-level drivers as a result of the performance of a subsequent I/O operation. The checksum filter driver calculates a second checksum value for the data block. The first checksum value and the second checksum value are compared. Data corruption is detected when a checksum mismatch occurs.

25 Claims, 6 Drawing Sheets

DETECTING LOW-LEVEL DATA CORRUPTION

CROSS-REFERENCE TO RELATED APPLICATIONS

N/A

BACKGROUND OF THE INVENTION

1. The Field of the Invention

The present invention relates to detecting data corruption. More specifically, the present invention relates to systems, methods, and computer program products for detecting low-level data corruption when data is transferred between an application and a mass storage location.

2. Background and Related Art

Computer systems and related technology affect many aspects of society. Indeed, the computer system's ability to process information has transformed the way we live and work. Computer systems now commonly perform a host of tasks (e.g., database management, electronic mail, and word processing) that prior to the advent of the computer system were performed manually.

A computer system typically includes an operating system, such as, for example, Unix or Microsoft® Windows®, which essentially manages the resources of the computer system, and various applications, such as word processing, spreadsheet, database software, presentation, email, etc. When user commands are entered into an application program, the application program often transfers execution of some commands to the operating system. For example, a "print" command entered into a word processor may ultimately result in the operating system performing at least some commands for queuing a document, formatting the document for output at a printer, sending the document to the printer, and so forth.

Users frequently issue Input/Output ("I/O") commands, requesting that data either be written to a mass storage device (e.g., issuing a "save" command to store word processor or electronic mail data) or read from a mass storage device (e.g., issuing an "open" command to retrieve previously stored word processor or electronic mail data). When an operating system receives an I/O command from a user, the operating system generally coordinates the operation of a stack of "low-level" drivers that operate between the application and the mass storage device. For example, when data is transferred from an application to a mass storage device (a write command), the stack of low-level drivers may perform a series of operations to prepare the data for encoding on a magnetic disk. On the other hand, when data is transferred from a mass storage device to an application (a read command) the stack of low-level drivers performs essentially the inverse of these operations to prepare the data for use by the application.

Data blocks are often used to transfer data between an application and a mass storage device. A data block is a fixed number of bytes of data that is transferred as a single unit. An operating system can convert bulk data into one or more data blocks before data is written to a mass storage device. Conversely, the operating system can combined one or more data blocks into bulk data when data is read from the mass storage device.

As a data block passes through successive drivers included in the stack of low-level drivers, each driver may perform specifically designated operations on the data block. When a write operation occurs, a file system driver may process the data block for use by a particular file system (e.g., Network File System or File Allocation Table File System) and pass the data block to a class driver. The class driver may process the data block for use by a particular class of mass storage device (e.g. magnetic hard disk or CD-ROM) and pass the data block to a port driver. The port driver may process the block data for use by a particular storage standard (e.g., Small Computer System Interface or Integrated Drive Electronics) and pass the data block to a host bus adapter driver. The host bus adapter driver may encode the data block for storage (e.g., magnetic or optical encoding). When a read operation occurs, a data block is transferred through the drivers in essentially the reverse order. A host bus adapter driver decodes the data block for use by the particular storage standard, a port driver processes the data block for use by a particular class of mass storage device, a class driver processes the data block for use by particular file system, and a file system driver processes the data block for use by the operating system.

As the stack of low-level drivers processes a data block, there exists some potential for data contained within a data block to become corrupted. Data corruption can occur at virtually any low-level driver. Specifically, a driver may contain one or more programming errors that introduce erroneous data into the data block such that subsequent processing of the data block results in an error. For example, during a read command a host bus adapter driver may decode a data block improperly. Similarly, hardware (e.g., disks, disk arrays, hardware adapters, etc.) may corrupt a data block. Thus, an incorrect data block may be transferred up through the stack of drivers to the operating system and applications.

Data corruption caused by low-level drivers and/or hardware can result in application program errors and sometimes can result in failure of the application program or associated computer system. Identifying and correcting the cause of these types of failures often requires a high degree of technical expertise. Furthermore, application program errors caused by low-level data corruption may erroneously appear to a user to result from a defect in the application program or the underlying operating system and not from the low-level driver that actually caused the data corruption. For example, an error in an application program may occur as a result of a port driver causing a data block to be corrupted. However, a user may not be aware of the problem until the application program fails. Since the data corruption results in an error at the application program, the user may unknowingly assume that the application program caused the data corruption.

As such, some application programs implement error-checking modules to detect data corruption. This is beneficial as there is an increased chance of detecting data corruption before an error in an application program occurs. However, such error-checking modules provide limited, if any information about the cause of data corruption. There may be a number of low-level drivers between an application program and a mass storage device, any one of which can potentially cause data corruption. Thus, even if an error-checking module detects data corruption, there may be no way to determine that low-level drivers are causing the data corruption or determine which low-level driver is responsible for the data corruption. Furthermore, each individual application must perform its own separate error-checking.

Therefore, systems, methods, and computer program products for detecting low-level data corruption when data is transferred between an operating system and a mass storage device are desired.

BRIEF SUMMARY OF THE INVENTION

The present invention relates to detecting low-level data corruption. A computer system can perform Input/Output ("I/O") operations, such as read operations and write operations, which cause data blocks to be transferred between an application and a mass storage location. A communication path between the application and the mass storage device includes a number of low-level drivers. The low-level drivers are configured such that during a write command a data block is transferred from the operating system, through each low-level driver in a specified order, to the mass storage device. The drivers are further configured such that during a read command a data block is transferred from the mass storage device, through each low-level driver in the reverse of the specified order, to the operating system. A checksum filter driver is included within the low-level drivers.

An I/O operation is performed that causes a data block to be transferred along the communication path between the application and the mass storage location. The I/O operation can include performing a write operation to cause the data block to be stored at the mass storage location or a read operation to cause the data block to be retrieved from the mass storage location. The checksum filter driver intercepts the data block as the data block is transferred and calculates a first checksum value for the data block. A checksum value for a data block may be calculated using any type of hashing algorithm, including cyclic redundancy checks, message digests, or any other algorithm for generating a checksum. The checksum value can be stored in system memory.

A subsequent I/O operation is performed that causes the data block to be subsequently transferred along the communication path between the application and the mass storage location. The subsequent I/O operation can also include performing a write operation or a read operation. The checksum filter driver intercepts the data block as the data block is subsequently transferred and calculates a subsequent checksum value for the data block.

The checksum values then are compared. When the checksum values differ, this indicates that one or more of the low-level drivers caused the data block to be corrupted. When the checksum values are equivalent, this indicates that no data corruption occurred.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

Figure 1A:
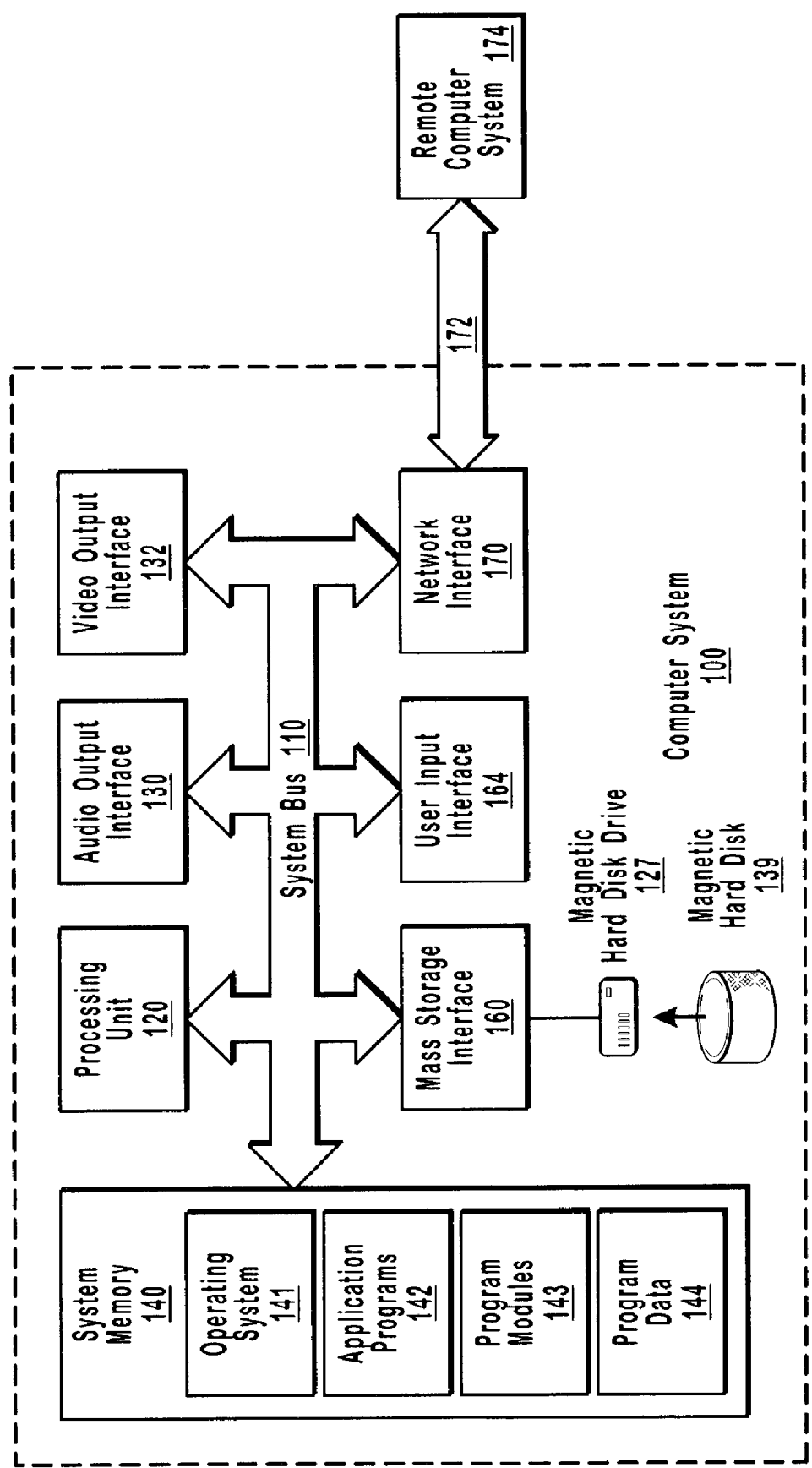
FIG. 1A illustrates an example computer system that provides a suitable operating environment for the present invention.

The present invention relates to systems, methods, and computer program products for detecting low-level data corruption when data blocks are transferred between an application and a mass storage location. A checksum filter driver is situated among a plurality of low-level drivers. When a data block is transferred through the plurality of low-level drivers and hardware as a result of an I/O operation, the checksum filter driver intercepts the data block and calculates a checksum value for the data block. When the data block is subsequently transferred through the plurality of low-level drivers and hardware as a result of a subsequent I/O operation, the checksum filter driver again intercepts the data block and calculates another checksum value for the data block. The checksum filter driver then compares the checksum values. Any difference between the checksum values may indicate low-level data corruption.

Embodiments of the present invention may comprise a general-purpose or special-purpose computer system including various computer hardware components, which are discussed in greater detail below. Embodiments within the scope of the present invention also include computer-readable media for carrying or having computer-executable instructions or data structures stored thereon. Computer-executable instructions comprise, for example, instructions and data which cause a general-purpose computer system or special-purpose computer system to perform a certain function or group of functions. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disc storage, magnetic disk storage or other magnetic storage devices, or any other media which can be used to carry or store desired program code means in the form of computer-executable instructions or data structures and which may be accessed by a general-purpose or special-purpose computer system.

In this description and in the following claims, a "network" encompasses any architecture where two or more computer systems may exchange data with each other. When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media.

In this description and in the following claims, a "computer system" encompasses one or more software modules, one or more hardware modules, or combinations thereof, which work together to perform operations on electronic data. For example, a computer system may include the hardware components of a personal computer, and one or more software modules, such various operating system and application components. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "mass storage location" encompasses any block addressable storage component or portion thereof that can be manipulated to store electronic data, to retrieve stored electronic data, and/or to remove electronic data from storage. Data blocks associated with a mass storage location may be a fixed number of bytes. A Mass storage location may include any storage component where electronic data is stored on the storage component using electromagnetism, such as, for example, removable magnetic disks (floppy disks, ZIP disks, Bernoulli cartridges, etc.), magnetic hard disks (e.g. magnetic hard disk 139), and magnetic tapes. Mass storage location also may include any storage components where electronic data is stored on the storage component using optical techniques (e.g. lasers), such as, for example, removable optical discs, optical hard discs, CD-ROMs, and Digital Versatile Disks ("DVDs"). Mass storage location further includes flash memory cards and other forms of memory, including volatile memory. It should be understood that data stored at a mass storage location persists even when an associated mass storage controller does not receive power. For example, with reference to FIG. 1A, electronic data stored at magnetic hard disk 139 would persist even when power to mass storage interface 127 is removed (e.g., by turning computer system 100 "off" or unplugging computer system 100). Nevertheless, the present invention is not necessarily limited to persistent storage. For example, the present invention could be practiced in a system that includes a RAM disk.

In this description and in the following claims, an "Input/Output ('I/O') Operation" encompasses any operation that causes electronic data to be manipulated at a mass storage location. I/O operations include, for example, operations that cause electronic data to be stored at a mass storage location (such as a write operation), operations that cause electronic data to be retrieved from a mass storage location (such as a read operation), and operations that cause electronic data to be removed form a mass storage location (such as a delete operation).

In this description and in the following claims, a "mass storage controller" encompasses one or more hardware components that encode electronic data for storage at a mass storage location and/or that decode electronic data for retrieval from a mass storage location. In FIG. 1, magnetic hard disk drive 127 can be viewed as a mass storage controller. That is, magnetic disk drive 127 can magnetically encode electronic data for storage on magnetic hard disk 139 and can decode previously magnetically coded electronic data for retrieval from magnetic hard disk 139. A mass storage controller may include magnetic removable disk drives (floppy drives, ZIP drives, Bernoulli drives), magnetic hard disk drives (such as magnetic hard disk drive 127), magnetic tape drives, optical removable disc drives, optical hard disc drives, CD-ROM drives, and DVD drives.

Those skilled in the art will appreciate that the invention may be practiced in computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

Figure 1B:
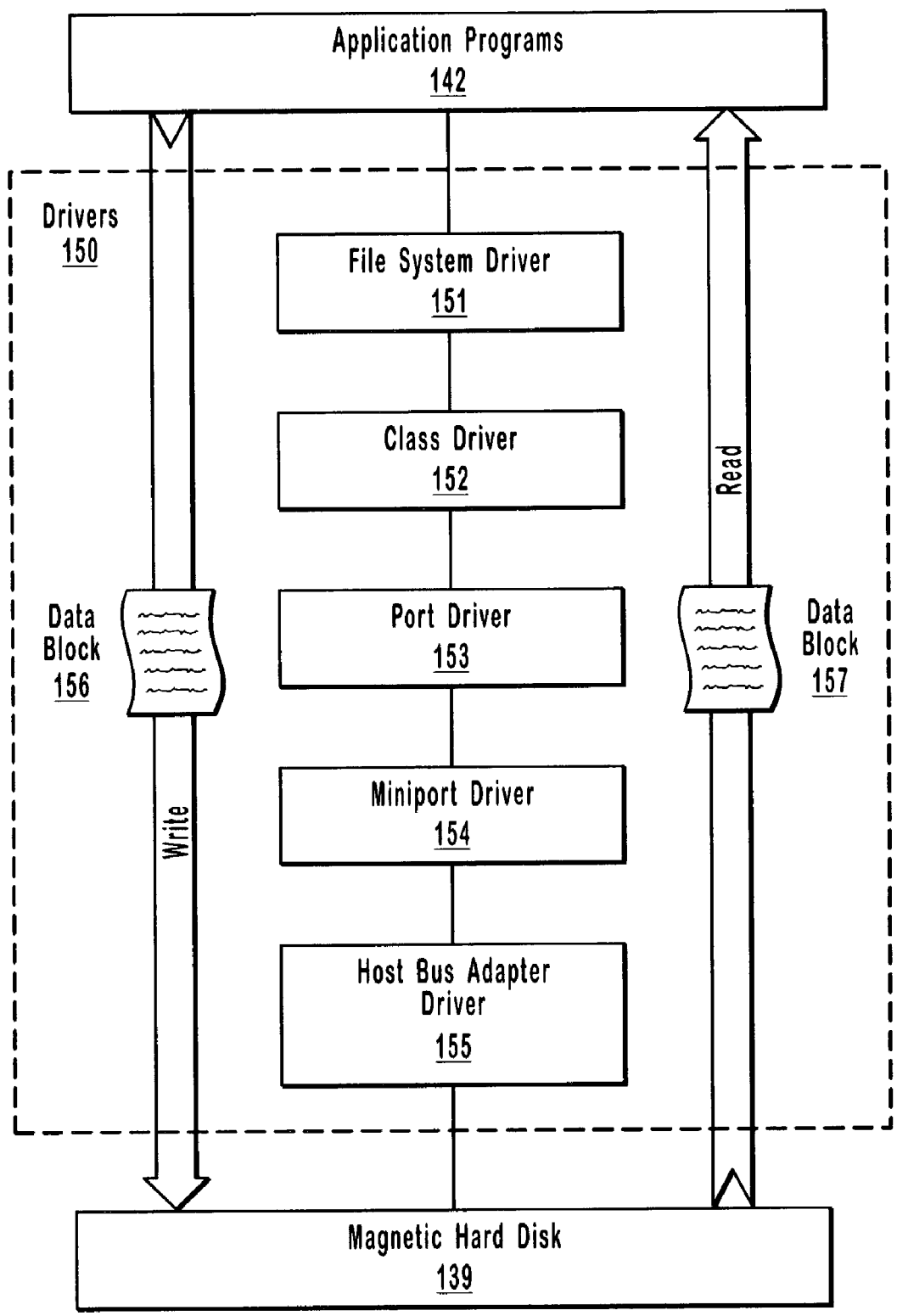
FIG. 1B illustrates an example configuration of drivers that provides a suitable operating environment for the present invention.

FIG. 1A, FIG. 1B, and the following discussion are intended to provide a brief, general description of a suitable environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1A, a suitable computing environment for the principles of the present invention includes a general-purpose computer system in the form of computer system 100. Computer system 100 may be a personal computer that has been adapted to perform the operations disclosed herein.

Computer system 100 can include user input interface 164, which receives information from an input device such as, for example, keyboard, microphone, or mouse. An input device may be coupled to user input interface 164 so as to enable the entry of information. An input device may transfer information over such a coupling in response to preprogrammed data or user manipulation of the input device.

Computer system 100 can also include video output interface 132, which provides a video output signal to external video display devices. Computer system 100 may be integrally positioned with or separate from a video display device, such as, for example, a color or monochrome computer monitor. A video display device can be coupled to video output interface 132 so as to receive a provided video output signal.

Similarly, computer system 100 can also include audio output interface 130, which provides an audio output signal to external audio output devices. Computer system 100 can be integrally positioned with or separate from an audio system, which may include a speaker or other device capable of emitting sound data. An audio system can be coupled to audio output interface 130 so as to receive a provided audio output signal.

Computer system 100 includes processing unit 120, which may allow for complex and flexible general-purpose processing capabilities. Processing unit 120 may execute computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 can be connectable to networks, such as, for example, an office-wide or enterprise-wide computer network, an intranet and/or the Internet. Computer system 100 can exchange data with external sources, such as, for example, remote computer systems and/or databases over such a network. Computer system 100 includes network interface 170, through which computer system 100 receives data from external sources and/or transmits data to external sources. As illustrated in FIG. 1A, network interface 170 facilitates the exchange of data with remote computer system 174 via network 172.

Computer system 100 can also include a magnetic hard disk drive 127 that facilitates access to magnetic hard disk 139. Magnetic hard disk drive 127 is coupled to system bus 110 by mass storage interface 160. Magnetic hard disk 139 provides nonvolatile storage of computer-executable instructions, data structures, program modules and other data for computer system 100. Although FIG. 1A illustrates a computer system configuration including magnetic hard disk drive 127 and magnetic hard disk 139, it should be understood that other types of mass storage controllers and mass storage locations can be utilized when practicing the present invention.

Modules included in computer system 100, such as, for example, operating system 141 can perform I/O operations, including read operations and write operations, that cause electronic data to be stored at magnetic hard disk 139 and/or retrieved from magnetic disk 139. When an I/O operation is performed, one or more data blocks are transferred along a communications path between magnetic hard disk 139 and one or more of the modules stored in system memory 140. A communications path can include a plurality of low-level drivers, where each low-level driver included in the plurality of low-level drivers formats and conditions each data block for use by a subsequent low-level driver (or for use by an application, operating system, or for storage at a mass storage location).

A write operation can cause a data block to be passed from application programs 142 and/or operating system 141, down through a plurality of low-level drivers, to magnetic hard disk 139. On the other hand, a read operation can cause a data block to be passed from magnetic hard disk 139, up through the plurality of low-level drivers, to operating system 141 and/or application programs 142. In one example embodiment, a plurality of low level drivers is configured as illustrated by drivers 150 in FIG. 1B.

In FIG. 1B, file system driver 151 interfaces between application programs 142 and class driver 152. File system driver 151 can be implemented to facilitate compatibility with a particular file system, such as, for example, Network File System ("NFS"), any of various so-called file allocation table ("FAT") file systems, NT file system ("NTFS"), CD-ROM file system ("CDFS"), etc.

Class driver 152 interfaces between file system driver 151 and port driver 153. Class driver 152 can be implemented to facilitate compatibility with a particular class of storage device, such as, for example, a hard disk, a tape, a CD-ROM, or a floppy disk. Port driver 153 interfaces between class driver 152 and miniport driver 154.

Port driver 153 can be implemented to facilitate compatibility with a particular storage standard, such as, for example, Small Computer System Interface ("SCSI"), Integrated Drive Electronics ("IDE"), Enhanced IDE ("EIDE"), Universal Serial Bus ("USB"), IEEE 1394, etc.

Miniport driver 154 interfaces between port driver 153 and host bust adapter driver 155. Vendors may implement storage standards in a variety of ways. Miniport driver 154 can abstract potential differences that occur between vendor implementations to provide compatible data to port driver 153 during read operations and host bus adapter driver 155 during write operations.

Host bus adapter driver 155 interfaces between miniport 154 and magnetic hard disk 139. Host bus adapter 155 can be implemented to control hardware components, such as, for example, magnetic hard disk drive 127, that facilitate encoding electronic data for storage at magnetic disk 139 and facilitate decoding previously encoded electronic data for retrieval from magnetic disk 139.

The drivers included in drivers 150 may be contained in one or more of the components and/or modules illustrated in FIG. 1A, such as, for example, system memory 140, processing unit 120, mass storage interface 160, and magnetic hard disk drive 127. More specifically, host bus adapter driver 155 can be implemented as a component of magnetic hard disk drive 127 or mass storage interface 160. System bus 110 and/or component specific communications channels, such as, for example, SCSI, IDE, IEEE 1394 or USB cables or similar wireless connections, may facilitate communication between the drivers included in drivers 150.

Drivers 150 is an example of a communications path for data to flow between application programs 142 and magnetic hard disk 139. The arrow labeled "Write" illustrates the direction of transfer for data block 156 when a write operation occurs. As shown, data block 156 can be passed from application programs 142 to file system 151, from file system 151 to class driver 152, from class driver 152 to port driver 153, from port driver 153 to miniport driver 154, from miniport driver 154 to host bus adapter driver 155, and from host bust adapter driver 155 to magnetic disk drive 139. On the other hand, the arrow labeled "Read" illustrates the direction of transfer for data block 157 when a read operation occurs. As shown, data block 157 is passed from magnetic disk drive 139 to host bus adapter driver 155, from host bus adapter driver 155 to miniport driver 154, from miniport driver 154 to port driver 153, from port driver 153 to class driver 152, from class driver 152 to file system driver 151, and from file system driver 151 to application programs 142.

While FIGS. 1A and 1B represent suitable operating environments for the present invention, the principles of the present invention may be employed in any system that is capable of, with suitable modification if necessary, implementing the principles of the present invention. The environment illustrated in FIGS. 1A and 1B is illustrative and represents only one of the wide variety of environments in which the principles of the present invention may be implemented.

In accordance with the present invention, checksum filter drivers, checksum calculation modules, and checksum comparison modules as well as associated data, including data blocks and checksum values, may be stored and accessed from any of the computer-readable media previously discussed. For example, portions of such modules and portions of associated program data may be included in operating system 141, application programs 142, program modules 143 and/or program data 144, for storage in system memory 140. When a mass storage location is coupled to computer system 100, such modules and associated program data may also be stored in the mass storage location. Execution of such modules may be performed in a distributed environment as previously described.

Figure 2:
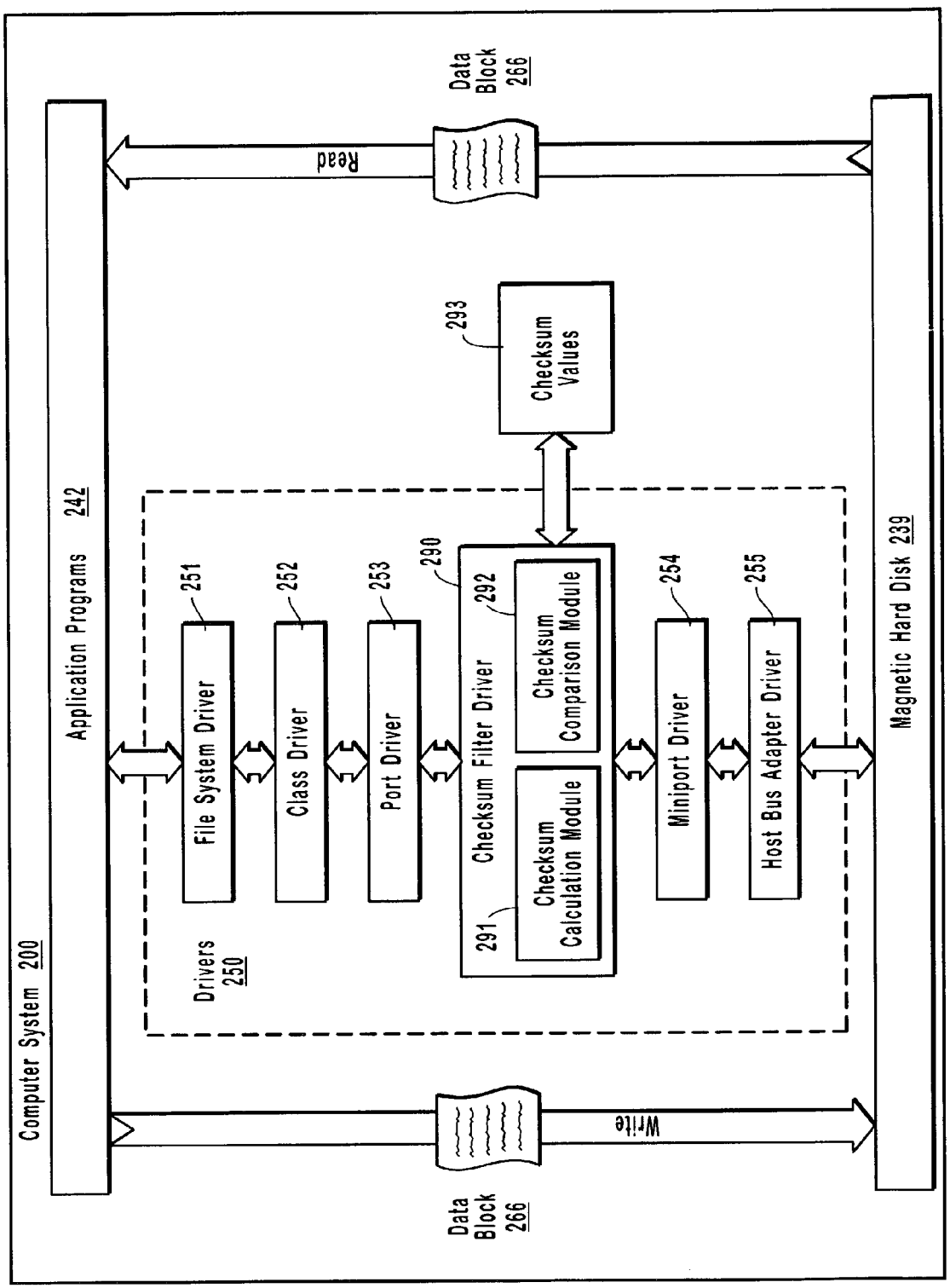
FIG. 2 illustrates an example driver configuration for detecting low-level data corruption.

FIG. 2 illustrates some of the components that can facilitate detecting low-level data corruption. Shown in FIG. 2 is computer system 200, which includes application programs 242, drivers 250, and magnetic hard disk 239. Included in drivers 250 is checksum filter driver 290 that can calculate checksum values for data blocks and compare checksum values for data blocks. An I/O operation causes a data block to be transferred along a communication path from application programs 242, through drivers 250, to magnetic hard disk 239 or along a communication path from magnetic hard disk 239, through drivers 250, to application programs 242. Note that a single checksum filter driver 290 is capable of performing error detection for all application programs 242 that access magnetic hard disk 239, as opposed to requiring error checking in each individual application.

Checksum filter driver 290 can intercept the data block from a driver or hardware in the communication path, calculate a checksum value for the data block, and then send the data block to the next driver in the communication path. Checksum filter driver 290 can also compare a first checksum value and a second checksum value to determine if the first checksum value and the second checksum value are equivalent. Checksum filter driver 290 can be dynamically inserted into and dynamically removed from any position within the stack of drivers 250. In one particular embodiment, the checksum filter driver 290 is positioned between port driver 253 and miniport driver 254. In another particular embodiment, the checksum filter driver 290 is positioned between class driver 252 and port driver 253.

The insertion or removal of checksum filter driver 290 does not affect other drivers included in drivers 250, although some performance degradation for 110 operations is likely. Thus, checksum filter driver 290 can be inserted with relatively little system impact when the detection of low-level data corruption becomes desirable and removed with relatively little system impact when the detection of low-level data corruption becomes undesirable. As described in more detail below, in identifying a particular driver or hardware responsible for corrupting data, checksum filter driver 290 may be moved between the various drivers as needed. A user interface can be provided to a user to enable the user to insert checksum filter driver 290 into drivers 250 and remove checksum filter driver from drivers 250.

Checksums have been used for verifying data integrity in other contexts. For example, TCP may add a checksum to the header of a data packet. Once verified, however, the checksum is striped from the header and discarded. In contrast, checksum filter driver 290 maintains checksum values 293 for individual data blocks. Among other things, the checksum values 293 help in identifying the cause or location of data corruption. For example (and as described in more detail below with respect to FIGS. 4A–4D), a checksum value may be calculated for an initial I/O operation and for a subsequent I/O operation, different checksum values indicate corruption and narrow the location of the data corruption to the hardware or software that processed the data block between checksum calculations.

Figure 3:
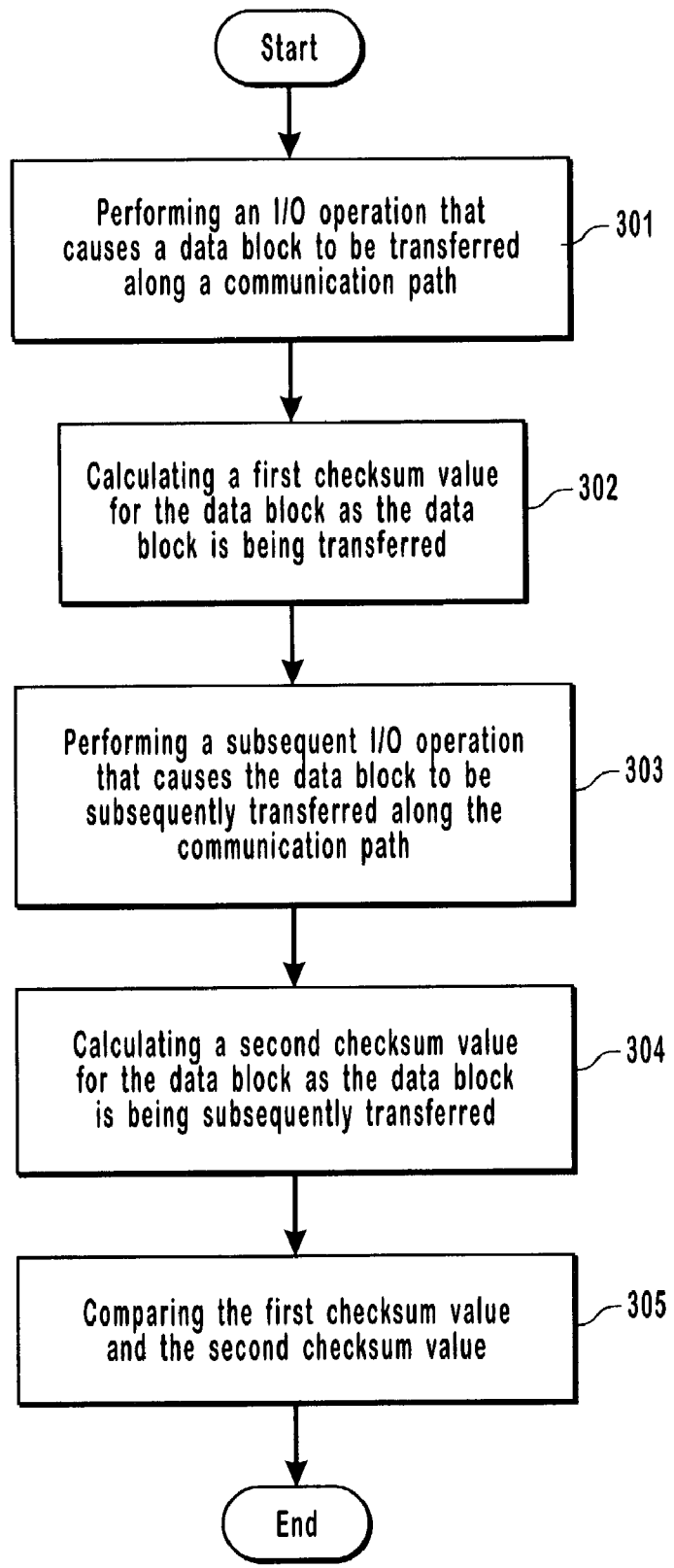
FIG. 3 is a flow diagram illustrating an example method for detecting low-level data corruption.

FIG. 3 is a flow diagram illustrating an example of a method for detecting data corruption. The method in FIG. 3 will be discussed with reference to the components included in FIG. 2.

The method in FIG. 3 begins with an act of performing an I/O operation that causes a data block to be transferred along a communication path (act 301). This can include application programs 242 performing a write operation. As indicated by the arrow labeled "Write," data block 266 is transferred from application programs 242 to magnetic hard disk 239. This write operation can cause data block 266 to be transferred along a communication path that includes drivers 250. An operating system (not shown) may perform appropriate formatting so that data block 266 is compatible for processing by a particular file system, and may help send data block 266 to file system driver 251.

File system driver 251 receives data block 266 from the operating system or application programs 242, performs appropriate formatting so that the data block 266 is compatible for processing by a particular class of storage device, and sends data block 266 to class driver 252. Class driver 252 receives data block 266, performs appropriate formatting so that data block 266 is compatible for processing according to a particular storage standard, and sends data block 266 to port driver 253. Port driver 253 receives data block 266, performs appropriate formatting so that data block 266 is compatible for processing according to a particular vendors' implementation of the particular storage standard, and sends data block 266 to miniport driver 254. However, checksum filter driver 290 intercepts data block 266 before miniport driver 254 receives data block 266.

The method in FIG. 3 includes an act of calculating a first checksum value for the data block as the data block is being transferred (act 302). This can include checksum calculation module 291 calculating a checksum value for data block 266. A hashing algorithm, such as, for example, CRC-32 or MD5, or any other checksum algorithm can be used to generate a checksum value in such a way that is relatively unlikely that a first data block and a second different data block would result in the same checksum value. The size of a checksum value may be significantly smaller than a data block, for example, a 32-bit (4 byte) checksum value can be generated for a 512-byte (or larger) data block. As the memory (i.e. the number of bits or bytes) allocated for a checksum value increases, the probability of a collision in checksum values (where a hash algorithm generates the same checksum for different data blocks) is reduced.

Checksum filter driver 290 may store calculated checksum values in checksum values 293. Checksum values 293 may be stored at magnetic hard disk 239, at another mass storage location associated with computer system 200, or in system memory. For example, checksum values 293 may be stored at other associated mass storage or in system memory to reduce the performance impact on magnetic hard disk 239.

Checksum filter driver 290 sends data block 266 to miniport driver 254. Miniport driver 254 receives data block 266, performs appropriate formatting so that data block 266 is compatible for magnetic encoding to magnetic hard disk 239, and sends data block 266 to host bus adapter driver 255. Host bus adapter 255 receives data block 266, magnetically encodes data block 266, and writes data block 266 to magnetic hard disk 239.

The method in FIG. 3 includes an act of performing a subsequent I/O operation that causes the data block to be subsequently transferred along the communication path (act 303). This can include operating system 241 performing a read operation. As indicated by the arrow labeled "Read," data bock 266 is transferred from magnetic hard disk 239 to application programs 242. This read operation can cause data block 266 to be transferred along a communication path that includes drivers 250.

As such, host bust adapter driver 255 reads data block 266 from magnetic hard disk 266, decodes data block 266 so that data block 266 is compatible for processing according to the particular vendor's implementation of the particular storage standard, and sends data block 266 to miniport driver 254. Miniport driver 254 receives data block 266, performs appropriate formatting so that data block 266 is compatible for processing according to the particular storage standard, and sends data block 266 to port driver 253. However, checksum filter driver 290 intercepts data block 266 before port driver 253 receives data block 266.

The method in FIG. 3 includes an act of calculating a second checksum value for the data block as the block of data is being subsequently transferred (act 304). This can include checksum calculation module 291 calculating a second checksum value for data block 266. Checksum filter driver 290 may or may not store the second checksum value to checksum values 293.

The method in FIG. 3 includes an act of comparing the first checksum value to the second checksum value (act 305). This can include checksum filter driver 290 retrieving the first checksum value from checksum values 293. If the second checksum value was included in checksum values 293, this can also include checksum filter driver 290 retrieving the second checksum value from checksum values 293. Checksum comparison module 292 compares the first checksum value and the second checksum value to determine if the first checksum value and the second checksum value are equivalent.

When the first checksum value and the second checksum value are equivalent, there is a reduced chance that data block 266 was corrupted by any of the drivers situated between checksum filter driver 290 and magnetic hard disk 239. In FIG. 2, this would include miniport driver 254 and host bus adapter driver 255. Thus, it follows that there is an increased likelihood that the data contained in data block 266 as a result of the write operation was identical to the data contained in data block 266 as a result of the read operation.

When a checksum mismatch occurs, that is the first checksum value and second checksum value differ, there is an increased chance that data block 266 was corrupted by one or more of the drivers situated between checksum filter driver 290 and magnetic hard disk 239. A preconfigured action may be taken in response to a checksum mismatch. This can include providing an error message to a user interface or a log file.

A preconfigured action may also include performing a third I/O operation, for example, performing a read operation to cause data block 266 to be transferred from magnetic hard disk 239 to application programs. A third checksum value can be generated for data block 266 and compared to the first checksum value. A computer system can include a plurality of host bust adapters. A third I/O operation can be forced to use a host bus adapter that is different from the host bus adapter used in act 303. Likewise, a computer system can include mirrored mass storage locations. If data block 266 was accessed from a mirrored mass storage location in act 303, a third I/O operation can be forced to use a mirrored mass storage location that is different from the mirrored mass storage location that was used in act 303.

In some cases, a mass storage location can be accessed using different transfer techniques, such as, for example, Direct Memory Access ("DMA") and Programmed Input/Output ("PIO"). If data block 266 was accessed using DMA in act 303, a third I/O operation can be forced to access data block 266 using PIO. On the other hand, if data block 266 was accessed using PIO in act 303, a third I/O operation can be forced to access data block 266 using DMA.

Checksum filter driver 290 sends data block 266 to port driver 253. Port driver 253 receives data block 266, performs appropriate formatting so that data block 266 is compatible for processing by a particular class of storage device, and sends data block 266 to class driver 252. Class driver 252 receives data block 266, performs appropriate formatting so that data block 266 is compatible for processing by a particular file system, and sends data block 266 to file system driver 251. File system driver 251 receives data block 266, performs appropriate formatting so that data block 266 is compatible for processing by the operating system and/or application programs 242, and sends data block 266 to the operating system and/or application programs 242. Application programs 242 receives data block 266.

Although checksum filter driver 290 is situated between port driver 253 and miniport driver 254 in FIG. 2, this is not required. Checksum filter driver 290 may be situated between any of the drivers included in drivers 250. In some embodiments, checksum filter driver is situated between different drivers at different times. For example, checksum filter driver 290 may be initially situated between port driver 253 and miniport driver 254. During the transfer of a data block that was caused by a read operation, checksum filter driver 290 may detect that the data block is corrupted. Either miniport driver 254 or host bus adapter driver 255 may be the cause of the data corruption. As such, checksum filter driver 290 can be subsequently situated between miniport driver 254 and host bus adapter driver 255. If checksum filter driver 290 does not subsequently detect corruption when reading the data block, there is an increased chance that miniport driver 254 is causing the corruption.

In other embodiments, a plurality of checksum filter drivers are included in drivers 250, for example, a first checksum filter driver may be included between port driver 253 and miniport driver 254 and a second filter checksum driver may be included between miniport driver 254 and host bus adapter driver 255. By adjusting where a checksum filter driver is situated or using a plurality of checksum filter drivers, there is an increased chance of locating a driver that is corrupting a data block.

Figure 4A:
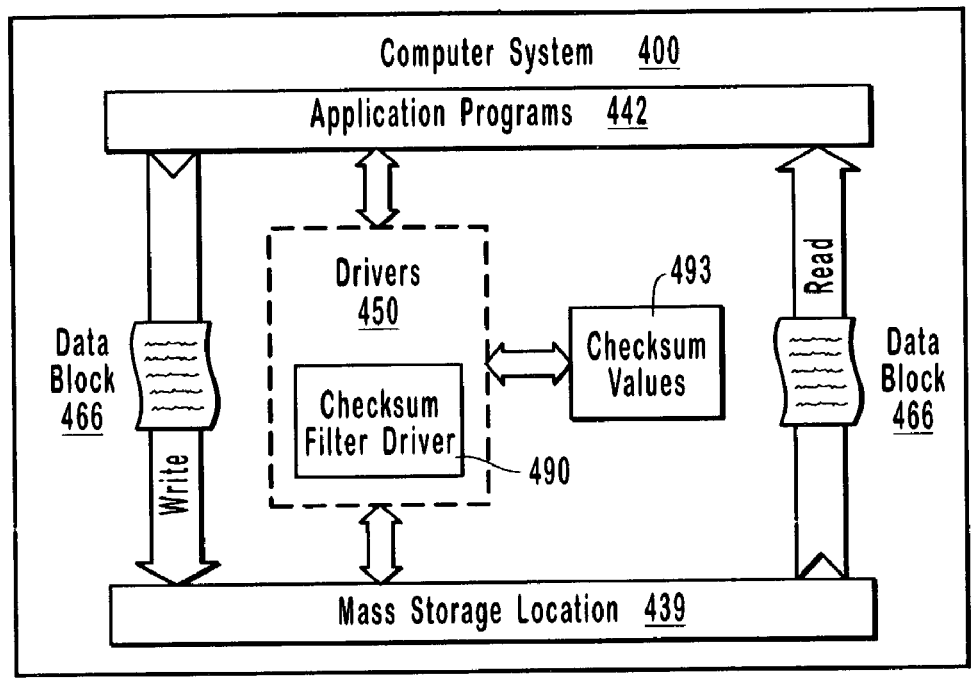
FIG. 4A illustrates an example write-read sequence of operations to detect low-level data corruption.

Although FIG. 2 illustrates practice of the present invention with a magnetic hard disk 239 and a particular configuration of low-level drivers, the present invention can be practiced with other types of mass storage locations and other configurations of low-level drivers. FIG. 4A illustrates an example of some of the functional components for performing a write-read sequence of operations to detect low-level data corruption. Computer system 400 includes drivers 450, which represents a generic configuration of low-level drivers. A write to mass storage location 439, as indicated by the arrow labeled "Write," causes data block 466 to be transferred from application programs 442, along a communication path including drivers 450, to mass storage location 439. From data block 466, checksum filter driver 490 generates a first checksum value as it is transferred during the write operation along the communication path. Checksum filter driver 490 can store the first checksum value in checksum values 493.

A read from mass storage location 439, as indicated by the arrow labeled "Read," causes data block 466 to be transferred from mass storage location 439, along the communication path including drivers 450, to application programs 442. As data block 466 is transferred along the communication path during the read operation, checksum filter driver 490 generates a second checksum value. Checksum filter driver 490 compares the first checksum value to the second checksum value to attempt to detect data corruption.

Similar to drivers 250, a plurality of checksum filter drivers can be included in drivers 450. For example, during a write operation, as indicated by the arrow labeled "Write," a first checksum filter driver situated between a class driver and a port driver (may generate a first checksum value and a second checksum filter driver situated between the port driver and a miniport driver may generate a second checksum value. The first checksum value and the second checksum value may be compared prior to data block 466 being written to mass storage location 439. During a read operation, as indicated by the arrow labeled "Read," the second checksum filter driver (closer to mass storage location 439) may generate a third checksum value and the first checksum filter may generate a fourth checksum value. The third and forth checksum values can be compared to each other or to the first and/or second checksum values to detect corruption in data block 466.

Figure 4B:
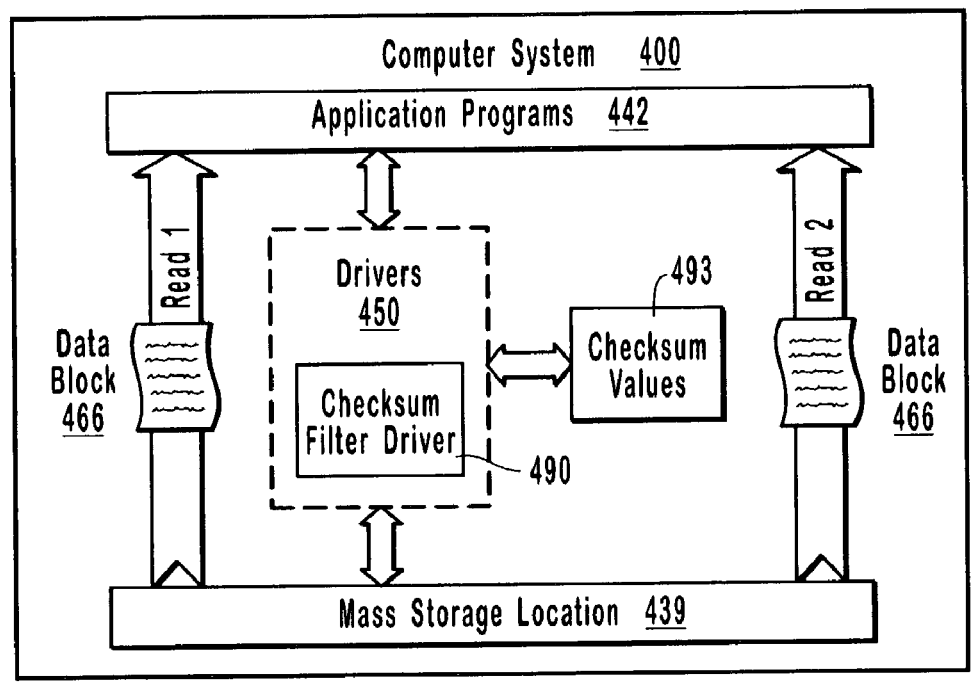
FIG. 4B illustrates an example read-read sequence of operations to detect low-level data corruption.

FIG. 4B illustrates an example of some components for performing a read-read sequence of operations to detect low-level data corruption. A first read from mass storage location 439, as indicated by the arrow labeled "Read 1," causes data block 466 to be transferred from mass storage location 439, along a communication path including drivers 450, to application programs 442. Checksum filter driver 490 generates a first checksum value for data block 466 as it is transferred along the communication path. Checksum filter driver 490 can store the first checksum value in checksum values 493.

A second read from mass storage location 439, as indicated by the arrow labeled "Read 2," also causes data block 466 to be transferred from mass storage location 439, along a communication path including drivers 450, to application programs 442. Checksum filter driver 490 generates a second checksum value for data block 466 as it is transferred along the communication path. Alternatively, a read-read sequence may be useful when multiple checksum filters are in place between various drivers in the driver stack. With multiple checksum filters, the second checksum value may be generated for a single I/O operation. Checksum filter driver 490 compares the first checksum value to the second checksum value to detect data corruption.

Figure 4C:
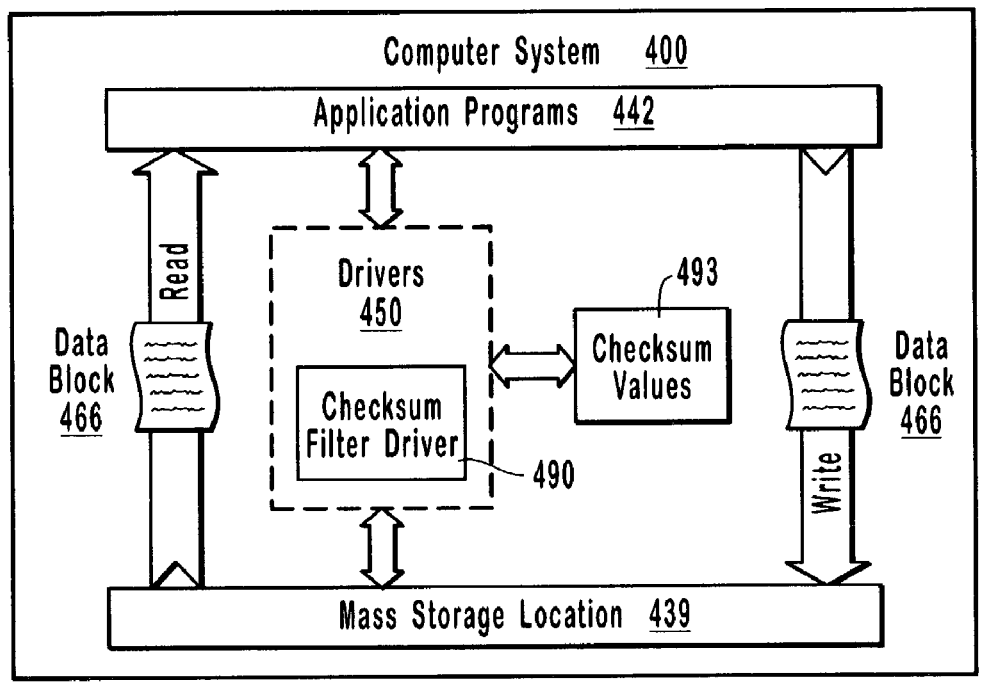
FIG. 4C illustrates an example read-write sequence of operations to detect low-level data corruption.

FIG. 4C illustrates an example of some components for performing a read-write sequence of operations to detect low-level data corruption. Among other times, a read-write sequence of operations may be useful when the known data is written for testing a particular driver. A read from mass storage location 439, as indicated by the arrow labeled "Read," causes data block 466 to be transferred from mass storage location 439, along a communication path including drivers 450, to application programs 442. Checksum filter driver 490 generates a first checksum value for data block 466 as it is transferred along the communication path. Checksum filter driver 490 can store the first checksum value in checksum values 493. A write to mass storage location 439, as indicated by the arrow labeled "Write," causes data block 466 to be transferred from application programs 442, along a communication path including drivers 450, to mass storage location 439. Checksum filter driver 490 generates a second checksum value for data block 466 as it is transferred along the communication path. Checksum filter driver 490 compares the first checksum value to the second checksum value to attempt to detect data corruption.

Figure 4D:
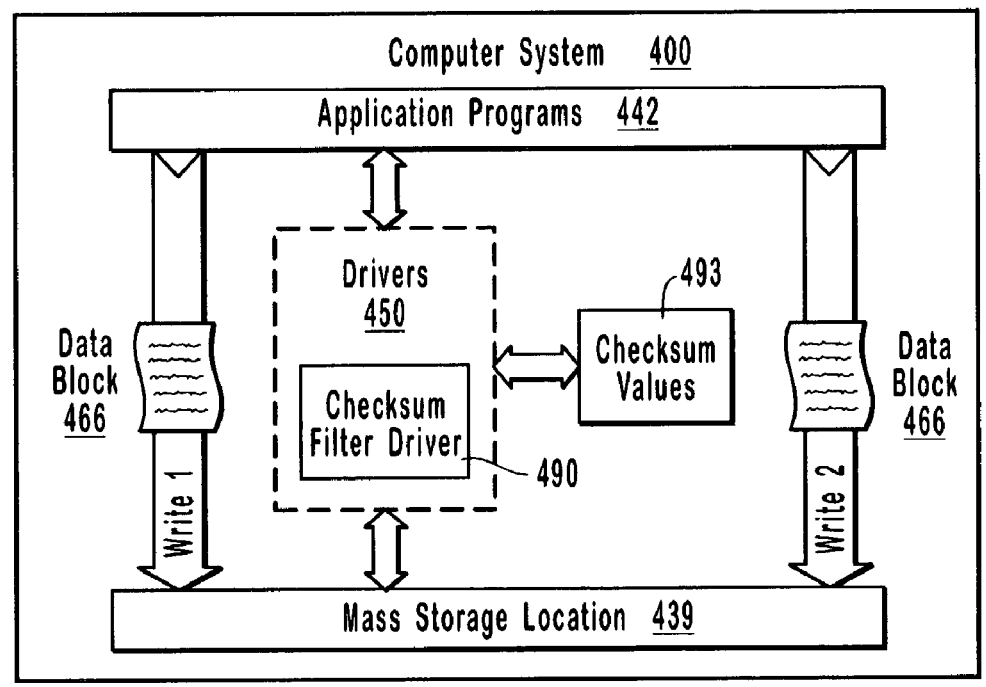
FIG. 4D illustrates an example write-write sequence of operations to detect low-level data corruption.

FIG. 4D illustrates an example of some components for performing a write-write sequence of operations to detect low-level data corruption. Among other times, a write-write sequence may be useful when multiple checksum filters are in place between various drivers in the driver stack. Accordingly, here and in other circumstances, multiple checksum values may be generated for a single I/O operation.

A write to mass storage location 439, as indicated by the arrow labeled "Write 1," causes data block 466 to be transferred from application programs 442, along a communication path including drivers 450, to mass storage location 439. Checksum filter driver 490 generates a first checksum value for data block 466 as it is transferred along the communication path. Checksum filter driver 490 can store the first checksum value in checksum values 493. A write to mass storage location 439, as indicated by the arrow labeled "Write 2," also causes data block 466 to be transferred from application programs 442, along a communication path including drivers 450, to mass storage location 439. Checksum filter driver 490 generates a second checksum value for data block 466 as it is transferred along the communication path. Checksum filter driver 490 compares the first checksum value to the second checksum value to detect data corruption.

By including checksum filter drivers in a communication path between an operating system or application programs, and a mass storage location, low-level data corruption during I/O operations is more easily detected. The use of checksum filter drivers can also aid in identifying a specific low-level driver that is causing data corruption. Further, since checksum filter drivers can be dynamically enabled, disabled, and moved-around, the impact on a computer system may be tailored to the needs of a given circumstance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a computer system that contains an operating system, one or more application programs, a mass storage location, and one or more drivers situated in a communication path between the one or more application programs and the mass storage location, wherein one of the drivers included in the one or more drivers is a checksum filter driver that calculates checksum values for data blocks that are transferred along the communication path, a method for detecting data corruption, the method comprising:

an act of performing an I/O operation that causes a data block to be transferred along the communication path;

an act of dynamically inserting a first checksum filter in a first location along the communication path;
an act of calculating a first checksum value for the data block as the data block is being transferred;
an act of dynamically inserting a second checksum filter in a second location along the communication path with at least one low level driver between the first location and the second location;
an act of performing a subsequent I/O operation that causes the data block to be subsequently transferred along the communication path;
an act of calculating a second checksum value for the data block as the data block is being subsequently transferred; and
an act of comparing the first checksum value and the second checksum value.

2. The method as recited in claim 1, wherein the act of performing an I/O operation comprises the following:
an net of performing a write operation.

3. The method as recited in claim 1, wherein the act of performing an I/O operation comprises the following:
an act of performing a road operation.

4. The method as recited in claim 1, wherein the act of performing an I/O operation that causes a data block to be transferred along the communication pat comprises the following:
an act of performing an I/O operation that causes the data block to be transferred between the one or more application programs and a mass storage location that stores data using electromagnetism.

5. The method as recited in claim 1, wherein the act of performing an I/O operation that causes a data block to be transferred along the communication path comprises the following:
an act of performing an I/O operation that causes the data block to be transferred between the one or mote application programs and a mass storage location that stores data using optical techniques.

6. The method as recited in claim 1, wherein the act of performing an I/O operation that causes a data block to be transferred along the communication path comprises the following:
an act of performing an I/O operation that causes a data block of a sized fixed by the mass storage location to be transferred along the communication path.

7. The method as recited in claim 1, wherein the act of calculating a first checksum value for the data block as the data block is being transferred comprises the following:
an act of using a hashing algorithm to generate a first checksum value.

8. The method as recited in claim 1, wherein the act of calculating a first checksum value for the data block as the data block is being transferred comprises the following:
an act of storing die first checksum value.

9. The method as recited in claim 8, wherein the act of storing the first checksum value comprises the following:
an act of storing the first checksum value in the system memory of the computer system.

10. The method as recited in claim 1, wherein the act of performing a subsequent I/O operation comprises the following:
an act of performing a write operation.

11. The method as recited in claim 1, wherein the act of performing a subsequent I/O operation comprises the following:
an act of performing a read operation.

12. The method as recited in claim 1, wherein the act of comparing the first checksum value and the second checksum value comprises the following:
an act of determining that the data block is corrupted when the first checksum value and the second checksum value are not equivalent.

13. The method as recited in claim 1, wherein the act of comparing the first checksum value and the second checksum value comprises the following:
an act of determining that the data block is not corrupted when the first checksum value and the second checksum value are equivalent.

14. A method as recited in claim 1, wherein the first checksum value is stored independently of the corresponding data block by the first checksum filter.

15. A computer program product for use in a computer system that includes an operating system, one or more application programs, a mass storage location, and one or more drivers situated in a communication path between the one or more application programs and the mass storage location, wherein one of the drivers included in one or more drivers is a checksum driver that calculates checksum values for data blocks that are transferred along the communication path, the computer program product for implementing a method for detecting data corruption, the computer program product comprising:
one or more computer-readable media carrying computer-executable instructions, that when executed at the computer system, cause the computer system to perform the method, including:
performing an I/O operation that causes a data block to be transferred along the communication path;
dynamically inserting a first checksum filter in a first location along the communication path;
calculating a first checksum value for the data block as the data block is being transferred;
dynamically inserting a second checksum litter in a second location along the communication path with at least one low level driver between the first location and the second location;
performing a subsequent I/O operation that causes the data block to be subsequently transferred along the communication path;
calculating a second checksum value for the data block as the data block is being subsequently transferred; and
comparing the first checksum value and the second checksum value.

16. The computer program product as recited claim 15, wherein the one or more computer-readable media include the mass storage location.

17. The computer program product as recited claim 15, wherein the one or more computer-readable media include system memory.

18. In a computer system that contains an operating system, one or more application programs, a mass storage location, and a plurality of drivers situated in a communication path between the one or more application programs and the mass storage location, wherein at least two of the drivers included in the plurality of drivers are checksum filter drivers that calculates checksum values for data blocks that are transferred along the communication path, a method for detecting data corruption, the method comprising:
an act of performing an initial I/O operation that causes a data block to be transferred along the communication path;
an act of calculating, at a first checksum filter driver at a first location on the communication path, a first checksum value for the data block as the data block is being transferred;

an act of calculating, at a second checksum filter driver at a second location on the communication path, wherein at least one low level driver is between the first location and the second location, a second checksum value for the data block as the data block is being subsequently transferred; and an ant of comparing the first checksum value and the second checksum value.

19. The method as recited in claim 18, wherein the first checksum value and the second checksum value correspond to the initial I/O operation.

20. The method as recited in claim 18, further comprising:

an act of performing a subsequent I/O operation that causes the data block to be subsequently transferred along the communication path, wherein the first checksum value corresponds to the initial I/O operation and the second checksum value corresponds to the subsequent I/O operation.

21. The method as recited in claim 18, wherein the act of performing an I/O operation comprises the following:

an act of performing at least one of a read operation and a write operation.

22. The method as recited in claim 18, wherein the act of performing an I/O operation that causes a data block to be transferred along the communication path comprises the following:

an act of performing an I/O operation that causes a data block of a sized fixed by the mass storage location to be transferred along the communication path.

23. The method as recited in claim 18, wherein the act of calculating a first checksum value for the data block as the data block is being transferred comprises the following:

an act of using a hashing algorithm to generate a first checksum value.

24. The method as recited in claim 18, wherein the act of calculating a first checksum value for the data block as the data block is being transferred comprises the following:

an act of storing the first checksum value.

25. The method as recited in claim 18, wherein the act of comparing the first checksum value and the second checksum value comprises the following:

an act of determining that the data block is corrupted when the first checksum value and the second checksum value are not equivalent; and an act of determining that the data block is not corrupted when the first checksum value and the second checksum value are equivalent.

* * * * *

UNITED STATES PATENT AND TRADEMARK OFFICE
CERTIFICATE OF CORRECTION

PATENT NO. : 7,020,798 B2  Page 1 of 1
APPLICATION NO. : 10/185612
DATED : March 28, 2006
INVENTOR(S) : Yi Meng et al.

It is certified that error appears in the above-identified patent and that said Letters Patent is hereby corrected as shown below:

On The Title Page, Item (56), under "Other Publications", line 2, delete "Corrpution" and insert -- Corruption --, therefor.

In column 14, line 46, delete "moved-around" and insert -- moved around --, therefor.

In column 15, line 19, in Claim 2, delete "net" and insert -- act --, therefor.

In column 15, line 22, in Claim 3, delete "road" and insert -- read --, therefor.

In column 15, line 25, in Claim 4, delete "pat" and insert -- path --, therefor.

In column 15, line 36, in Claim 5, delete "mote" and insert -- more --, therefor.

In column 15, line 55, in Claim 8, delete "die" and insert -- the --, therefor.

In column 16, line 35, in Claim 15, delete "litter" and insert -- filter --, therefor.

In column 16, line 47, in Claim 16, after "recited" insert -- in --, therefor.

In column 16, line 50, in Claim 17, after "recited" insert -- in --, therefor.

In column 17, line 7, in Claim 18, delete "ant" and insert -- act --, therefor.

Signed and Sealed this

Twenty-first Day of July, 2009

JOHN DOLL
*Acting Director of the United States Patent and Trademark Office*